(12) United States Patent
Takeshima

(10) Patent No.: US 10,495,765 B2
(45) Date of Patent: Dec. 3, 2019

(54) RADIATION IMAGING APPARATUS, RADIATING IMAGING SYSTEM, RADIATION IMAGING SYSTEM, AND STORAGE MEDIUM

(71) Applicant: CANON KABUSHIKI KAISHA, Tokyo (JP)

(72) Inventor: Mina Takeshima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 15/700,347

(22) Filed: Sep. 11, 2017

(65) Prior Publication Data

US 2018/0095183 A1 Apr. 5, 2018

(30) Foreign Application Priority Data

Sep. 30, 2016 (JP) .................................. 2016-194775

(51) Int. Cl.
*G01T 1/29* (2006.01)
*G01T 1/17* (2006.01)
*G01T 1/208* (2006.01)

(52) U.S. Cl.
CPC .............. *G01T 1/2992* (2013.01); *G01T 1/17* (2013.01); *G01T 1/208* (2013.01)

(58) Field of Classification Search
CPC ................................ G01T 1/2992; G01T 1/00
See application file for complete search history.

(56) References Cited

U.S. PATENT DOCUMENTS

| 7,415,097 | B2 * | 8/2008 | Spahn ..................... | G03B 42/02 378/91 |
| 2006/0188061 | A1 * | 8/2006 | Takenaka ............... | G01N 23/04 378/62 |
| 2007/0291900 | A1 * | 12/2007 | Hahm ....................... | G06T 5/50 378/98.8 |
| 2009/0001276 | A1 * | 1/2009 | Yagi ....................... | A61B 6/032 250/370.09 |
| 2013/0170627 | A1 * | 7/2013 | Topfer ................. | A61B 6/4233 378/207 |

FOREIGN PATENT DOCUMENTS

JP 2013-118983 6/2013

* cited by examiner

*Primary Examiner* — Chikaodili E Anyikire
(74) *Attorney, Agent, or Firm* — Venable LLP

(57) ABSTRACT

A radiation imaging apparatus that is operable in a plurality of imaging modes with different frame rates, and includes a radiation detection unit configured to obtain, based on a set imaging mode, a radiation image based on charges accumulated by radiation irradiation, includes: a collection control unit configured to set, based on a difference in frame rate in a combination of the set imaging mode and an imaging mode switched from the imaging mode, a collection time of an offset image for correcting an offset component of the radiation image; and an image obtainment unit configured to obtain the offset image based on the collection time.

13 Claims, 13 Drawing Sheets

F I G. 4

| USE STATE | STATE DEFINITION | SYSTEM OPERATION STATE EXAMPLE | OFFSET IMAGE COLLECTION |
|---|---|---|---|
| A | NON-USE | · ONLY IMAGING APPARATUS IS ACTIVE (POWER OF CONTROL APPARATUS IS OFF) | OFF |
| B | TEMPORARY USE STOP | · BOTH IMAGING APPARATUS AND CONTROL APPARATUS ARE ACTIVE BUT NONE ARE OPERATED<br>· STANDBY TIME DURING EXAMINATION | AUTOMATIC COLLECTION |
| C | IN-USE | · EXAMINATION OR EXAMINATION PREPARATION IS IN PROGRESS | AUTOMATIC COLLECTION |
| D | | | MANUAL COLLECTION |

FIG. 5A

| ORDINAL NUMBER | MODE No. | FRAME RATE [fps] | FRAME RATE DIFFERENCE FPS_dif | COLLECTION TIME [sec] (DISCARDING TIME UNTIL START OF OBTAINMENT) |
|---|---|---|---|---|
| 1 | 1 | 30 | — | 5 |
| 2 | 3 | 30 | 0 | 0.5 |
| 3 | 0 | 15 | 15 | 5 |
| 4 | 5 | 15 | 0 | 0.5 |
| 5 | 4 | 7.5 | 7.5 | 5 |
| 6 | 6 | 7.5 | 0 | 0.5 |
| 7 | 2 | 3 | 4.5 | 0.5 |

FIG. 5B

| ORDINAL NUMBER | MODE No. | FRAME RATE [fps] | CHANGE RATE [%] OF FRAME RATE | COLLECTION TIME [sec] (DISCARDING TIME UNTIL START OF OBTAINMENT) |
|---|---|---|---|---|
| 1 | 1 | 30 | — | 5 |
| 2 | 3 | 30 | 0 | 0.5 |
| 3 | 0 | 15 | 50 | 5 |
| 4 | 5 | 15 | 0 | 0.5 |
| 5 | 4 | 7.5 | 50 | 5 |
| 6 | 6 | 7.5 | 0 | 0.5 |
| 7 | 2 | 3 | 40 | 0.5 |

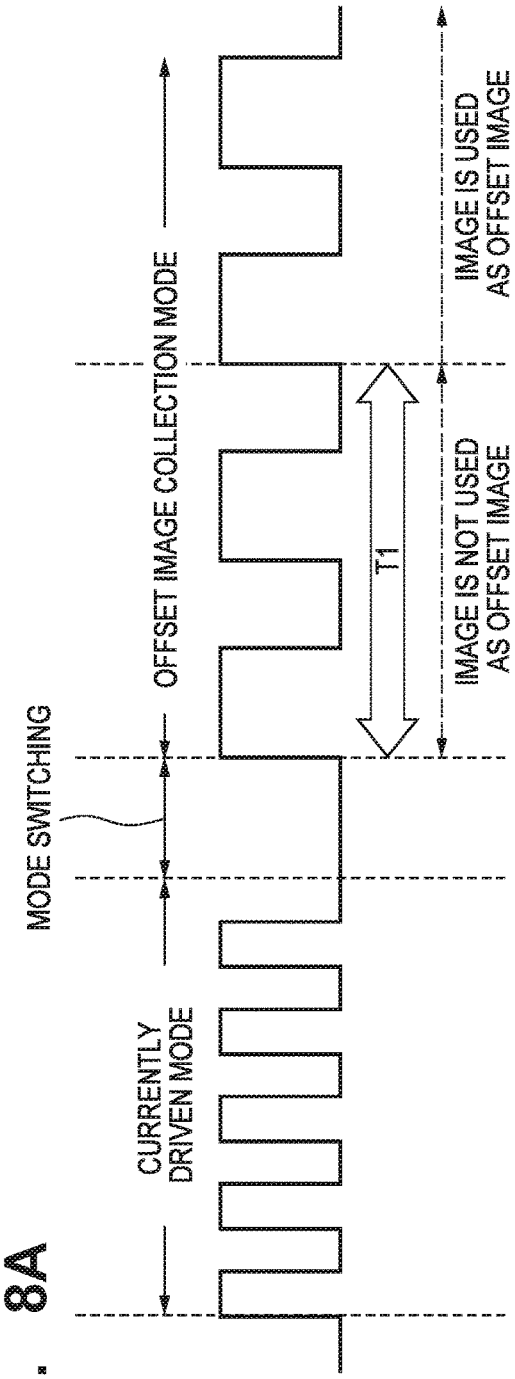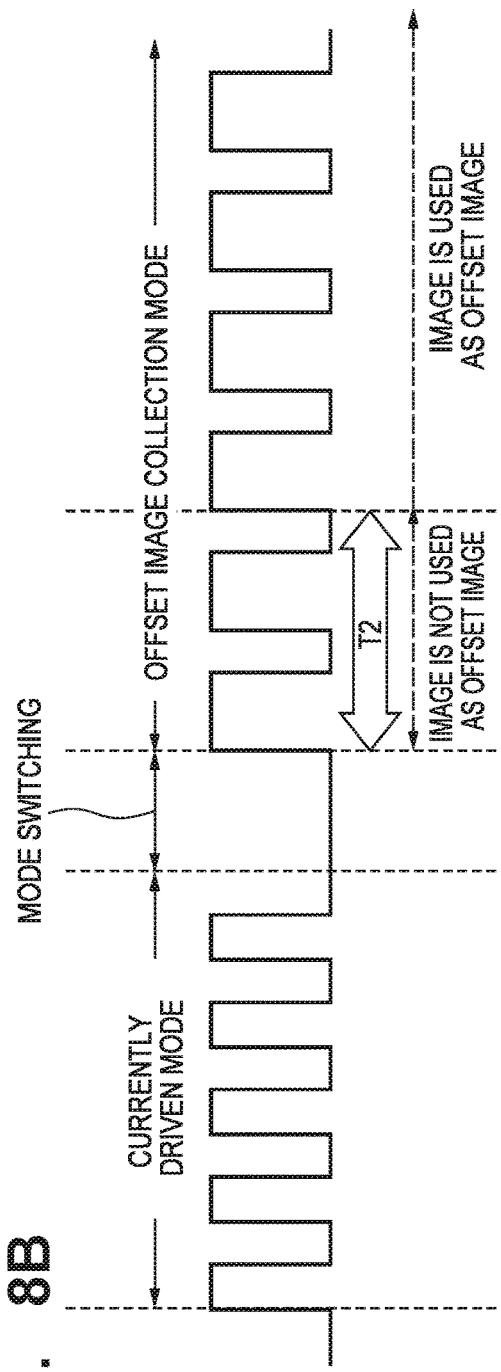

FIG. 9A

| ORDINAL NUMBER | FRAME RATE CHANGE [fps] | FRAME RATE DIFFERENCE FPS_dif | COLLECTION TIME [sec] (DISCARDING TIME UNTIL START OF OBTAINMENT) |
|---|---|---|---|
| 6→1 | 7.5→30 | 22.5 | 5 |
| 1→3 | 30→30 | 0 | 0.5 |
| 3→5 | 30→15 | 15 | 5 |
| 5→2 | 15→3 | 12 | 0.5 |
| 2→4 | 3→7.5 | 4.5 | 0.5 |
| 4→0 | 7.5→15 | 7.5 | 5 |
| 0→6 | 15→7.5 | 7.5 | 5 |

FIG. 9B

| ORDINAL NUMBER | FRAME RATE CHANGE [fps] | CHANGE RATE [%] OF FRAME RATE | COLLECTION TIME [sec] (DISCARDING TIME UNTIL START OF OBTAINMENT) |
|---|---|---|---|
| 6→1 | 7.5→30 | 400 | 5 |
| 1→3 | 30→30 | 0 | 0.5 |
| 3→5 | 30→15 | 50 | 5 |
| 5→2 | 15→3 | 20 | 0.5 |
| 2→4 | 3→7.5 | 250 | 0.5 |
| 4→0 | 7.5→15 | 200 | 5 |
| 0→6 | 15→7.5 | 50 | 5 |

F I G. 11

| FRAME RATE CHANGE [fps] | FRAME RATE DIFFERENCE FPS_dif | COLLECTION TIME [sec] (DISCARDING TIME UNTIL START OF OBTAINMENT) |
|---|---|---|
| 30⇔15 | 15 | c*FPS_dif |
| 30⇔7.5 | 22.5 | |
| 30⇔3 | 27 | |
| 15⇔7.5 | 7.5 | |
| 15⇔3 | 12 | |
| 7.5⇔3 | 4.5 | |

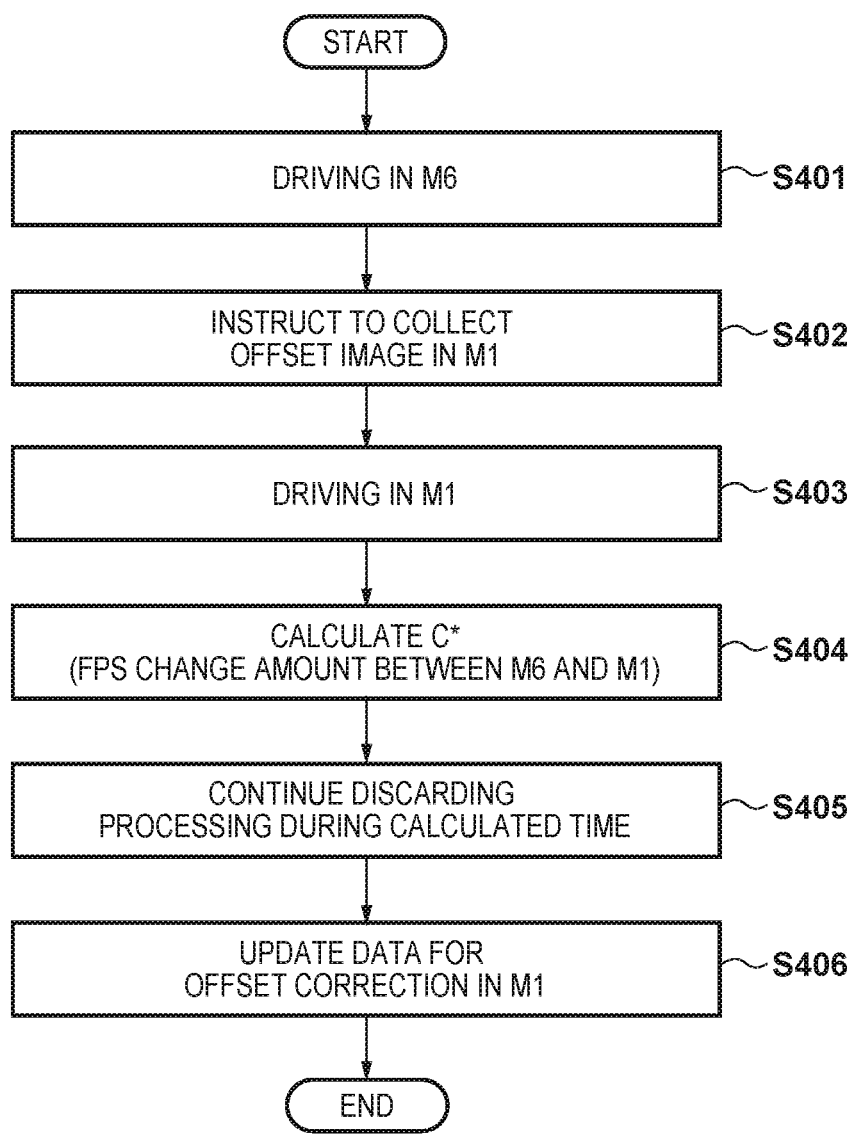

RADIATION IMAGING APPARATUS, RADIATING IMAGING SYSTEM, RADIATION IMAGING SYSTEM, AND STORAGE MEDIUM

BACKGROUND OF THE INVENTION

Field of the Invention

The present invention relates to a radiation imaging apparatus, a radiation imaging system, a radiation imaging method, and a storage medium.

Description of the Related Art

A radiation imaging apparatus that obtains a radiation image by irradiating an object with radiation from a radiation generation apparatus, and performing image processing for image data obtained by digitizing the intensity distribution of the radiation transmitted through the object has become commercially available.

In the radiation imaging apparatus, even in a state in which no radiation irradiation is performed, signal charges (dark charges) are undesirably generated to some extent. To prevent the image quality from degrading due to superimposition of the dark charges on signal charges generated by radiation irradiation, a difference component (to be referred to as an offset component hereinafter) between an image (to be referred to as a radiation image hereinafter) obtained in a state in which radiation irradiation is performed and an image (to be referred to as an offset image hereinafter) obtained in a state in which no radiation irradiation is performed is corrected. The offset image may change in accordance with changes in use environment, energization time, and imaging mode of the radiation imaging apparatus. Thus, it is necessary to update and hold an offset image corresponding to the use environment and the like, as needed.

U.S. Pat. No. 7,415,097 discloses an arrangement in which the priority level of an offset image for each of a plurality of imaging modes is determined in accordance with the use time, the use frequency based on the imaging execution count, and the like, and the offset image is collected. Japanese Patent Laid-Open No. 2013-118983 discloses an arrangement in which an offset image in an imaging mode whose use frequency is high in accordance with a selected imaging method is preferentially collected.

SUMMARY OF THE INVENTION

When switching an imaging mode in a radiation imaging apparatus capable of performing imaging in a plurality of imaging modes, the influence of an imaging mode before switching may be superimposed on a captured image after switching. If an offset image is obtained by switching the imaging mode, an artifact may occur in the offset image after mode switching due to mode switching. Therefore, if the data is used to correct an offset component, an artifact may be superimposed on the corrected image.

The present invention has been made in consideration of the above problem, and provides a radiation imaging technique in which when performing imaging by switching an imaging mode, it is possible to obtain an offset image for offset correction by reducing the influence of an artifact caused by switching of the imaging mode.

According to one aspect of the present invention, there is provided a radiation imaging apparatus that is operable in a plurality of imaging modes with different frame rates, and includes a radiation detection unit configured to obtain, based on a set imaging mode, a radiation image based on charges accumulated by radiation irradiation, comprising: a collection control unit configured to set, based on a difference in frame rate in a combination of the set imaging mode and an imaging mode switched from the imaging mode, a collection time of an offset image for correcting an offset component of the radiation image; and an image obtainment unit configured to obtain the offset image based on the collection time.

According to the present invention, it is possible to provide a radiation imaging technique capable of obtaining an offset image for offset correction by reducing the influence of an artifact caused by switching of an imaging mode.

Further features of the present invention will become apparent from the following description of exemplary embodiments (with reference to the attached drawings).

BRIEF DESCRIPTION OF THE DRAWINGS

FIG. 4 is a table exemplifying the use state of the radiation imaging apparatus;

FIGS. 5A and 5B are tables for explaining an offset image collection time according to the first embodiment;

FIGS. 8A and 8B are timing charts each for explaining an offset image collection time;

FIGS. 9A and 9B are views each for explaining an offset image collection time according to the second embodiment;

FIG. 11 is a table for explaining an offset image collection time according to the third embodiment; and FIG. 12 is a flowchart for explaining the processing of a radiation imaging system according to the third embodiment.

DESCRIPTION OF THE EMBODIMENTS

Embodiments of the present invention will be exemplarily described in detail below with reference to the accompanying drawings. Note that the constituent elements described in the embodiments are merely examples. The technical scope of the present invention is determined by the scope of claims and is not limited by the following individual embodiments.

<First Embodiment>

(Example of Arrangement of Radiation Imaging System)

Figure 1:
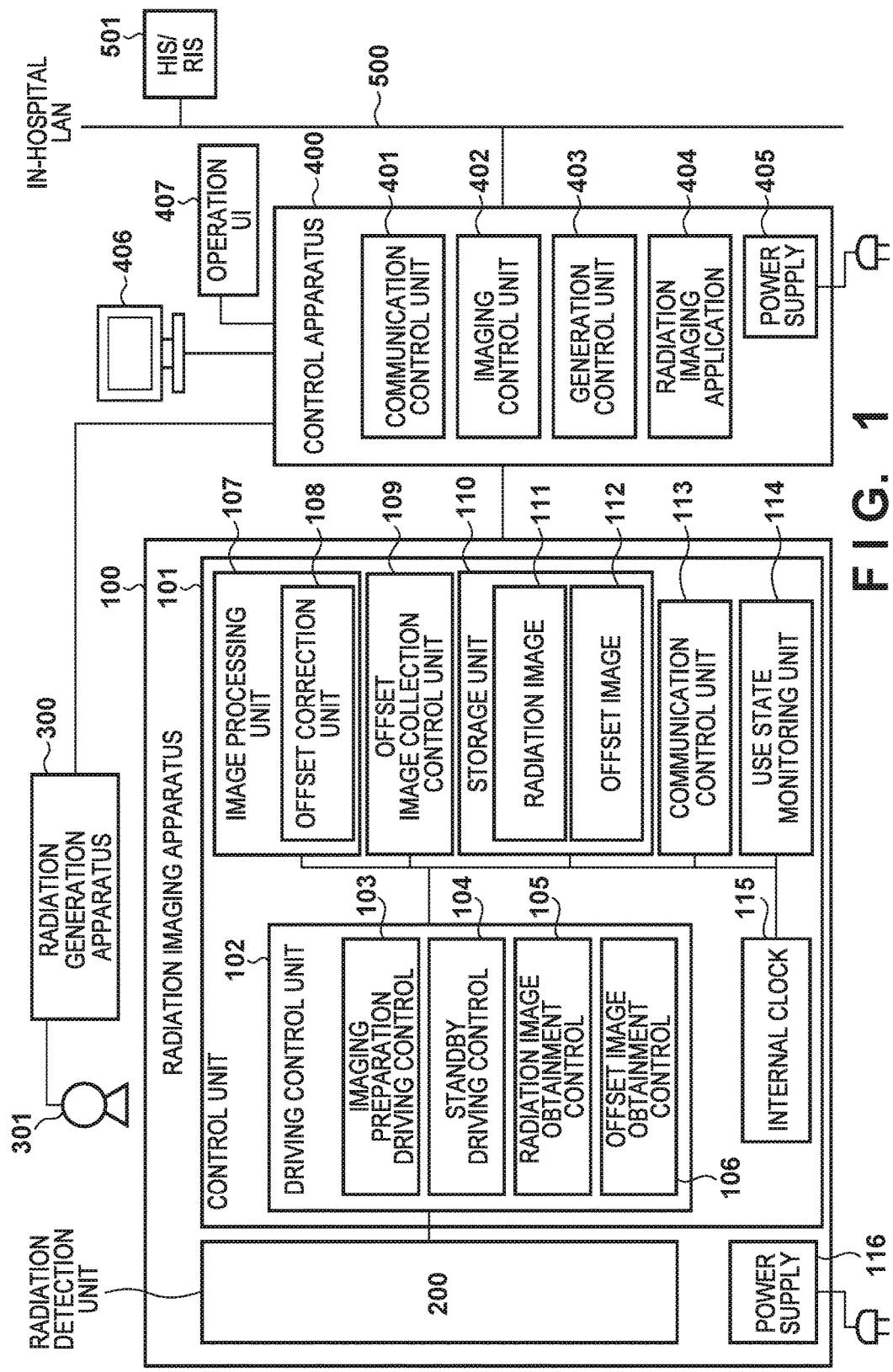
FIG. 1 is a block diagram showing an example of the arrangement of a radiation imaging system according to the first embodiment.

FIG. 1 is a block diagram showing an example of the arrangement of a radiation imaging system according to the first embodiment. The radiation imaging system includes a radiation imaging apparatus 100 with a radiation detection unit 200, a radiation generation apparatus 300 that controls a radiation source 301 for performing radiation irradiation, and a control apparatus 400 that controls the radiation imaging apparatus 100 and the radiation generation apparatus 300.

The control apparatus 400 is connected to, for example, a network 500 such as a LAN (Local Area Network). The network 500 is connected to an RIS (Radiology Information System) and an HIS (Hospital Information System) (HIS/RIS 501). The control apparatus 400 and the HIS/RIS 501 can communicate with each other, and exchange the imaging order of radiation images, imaging information including, for example, patient information, and captured image data.

The radiation imaging apparatus 100 includes the radiation detection unit 200 that detects radiation and generates image data, a control unit 101 that controls imaging and a communication operation by the radiation imaging apparatus 100, and a power supply 116. The control unit 101 includes the following functional components. A driving control unit 102 controls driving of the radiation detection unit 200 and obtainment of a radiation image and offset image. An image processing unit 107 performs image processing for an image obtained from the radiation detection unit 200. An offset image collection control unit 109 controls an offset image collection time. The offset image collection control unit 109 (collection control unit) can set the collection time of an offset image for correcting an offset component of a radiation image based on a difference in frame rate in a combination of a set imaging mode and an imaging mode switched from the set imaging mode. A storage unit 110 stores obtained image data (radiation image and offset image). A communication control unit 113 controls communication with the control apparatus 400. A use state monitoring unit 114 monitors the use state of the radiation imaging system (radiation imaging apparatus). An internal clock 115 (timer unit) obtains imaging time, an elapsed time from when the imaging mode is switched, time information for regularly updating the offset image, and the like. The control unit 101 can read out a program and the like saved in a storage unit, and control the overall radiation imaging apparatus based on the program and the like. Alternatively, a control signal generation circuit implemented by an ASIC or the like may control the apparatus, or the program and the control circuit may control the overall apparatus.

The control apparatus 400 includes the following functional components. An imaging control unit 402 controls the image obtainment timing and imaging conditions of the radiation imaging apparatus 100. A generation control unit 403 controls the radiation irradiation timing and irradiation conditions of the radiation generation apparatus 300. A communication control unit 401 controls communication with the radiation imaging apparatus, communication with the radiation generation apparatus, and communication with the network 500. A radiation imaging application 404 is an application that controls processing such as collection and display of a captured image from the radiation imaging apparatus 100, acceptance of an imaging order, and imaging information registration. A display unit 406 displays the captured image and imaging information. An operation UI 407 functions as a user interface for operating the radiation imaging system.

Information communication can be performed between the control apparatus 400 and the radiation imaging apparatus 100 and between the control apparatus 400 and the radiation generation apparatus 300 by wireless communication, a dedicated signal line, wired communication by cable connection using a standard such as RS232C, USB, or Ethernet®, or a combination thereof. Between the control apparatus 400 and the radiation imaging apparatus 100, for example, it is possible to exchange image data, perform control communication such as image obtainment condition setting and apparatus state obtainment, and exchange a synchronization signal such as a notification of an image obtainment timing or radiation irradiation enable timing. Furthermore, between the control apparatus 400 and the radiation generation apparatus 300, for example, it is possible to set radiation irradiation conditions, obtain the apparatus status, perform control communication of actual irradiation information and the like, and exchange a synchronization signal such as a notification of a radiation irradiation timing.

(Example of Arrangement of Radiation Detection Unit 200)

Figure 2:
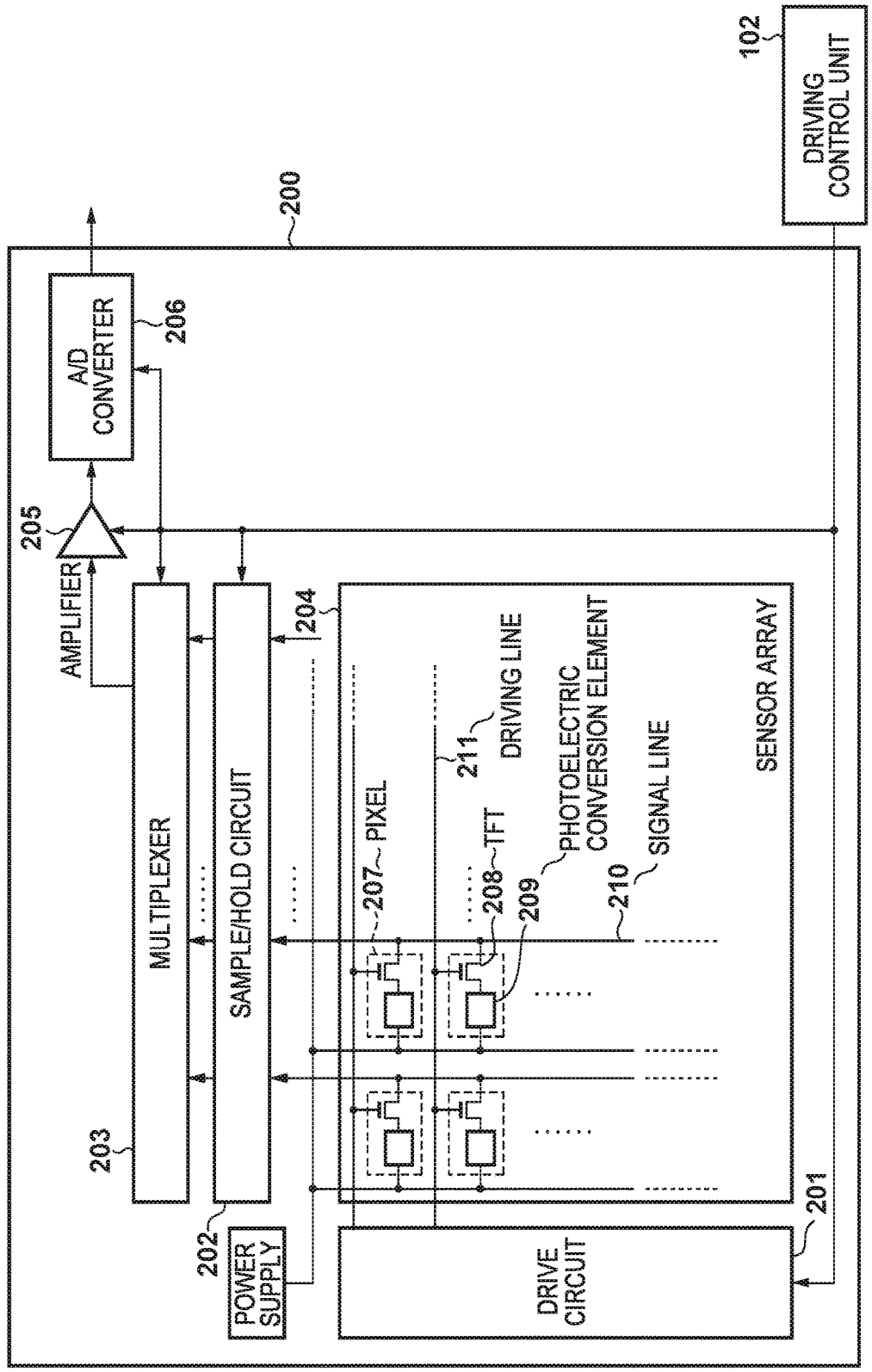
FIG. 2 is a circuit diagram showing an example of the arrangement of a radiation detection unit in a radiation imaging apparatus.

FIG. 2 is a circuit diagram showing an example of the arrangement of the radiation detection unit 200. The radiation detection unit 200 can operate in a plurality of imaging modes with different frame rates, and obtain, based on the set imaging mode, a radiation image based on charges accumulated by radiation irradiation. The radiation detection unit 200 includes a sensor array 204 including a plurality of pixels arranged in a two-dimensional array to form a plurality of rows and a plurality of columns. Each pixel 207 on the sensor array includes, for example, a switch element 208 such as a TFT and a photoelectric conversion element 209, and is formed by providing, for example, a phosphor thereon.

In this case, radiation entering the radiation detection unit 200 is converted into visible light through the phosphor, and the converted visible light enters the photoelectric conversion element 209 of each pixel, thereby generating charges corresponding to the visible light in each photoelectric conversion element 209. Note that in this embodiment, the above-described phosphor and photoelectric conversion element form a conversion element that converts incident radiation into charges. For example, a so-called direct conversion type conversion element that directly converts incident radiation into charges may be formed without providing any phosphor. It is possible to accumulate charges and read out the charges by switching ON/OFF of the switch element 208, thereby obtaining a radiation image.

In each pixel on a given row on the two-dimensional sensor array of the radiation detection unit, if a drive circuit 201 (driving unit) applies the ON voltage of the TFT to a driving line 211, the TFT of each pixel on the row is turned on, and charges are held in a sample/hold circuit 202 (holding unit) through a corresponding signal line 210. After that, the held charges output from the pixels are sequentially read out via a multiplexer 203 (output control unit), amplified by an amplifier 205 (amplification unit), and then converted into digital image data by an A/D converter 206 (conversion unit).

With respect to a row for which a charge readout operation has ended, when the drive circuit 201 applies the OFF voltage of the TFT to the driving line 211, each pixel on the row returns to accumulation of charges. In this way, the drive circuit 201 sequentially drives the rows on the sensor array, and executes a scan, and the charges output from all the pixels are converted into digital values ultimately. This can read out radiation image data. The driving control unit 102 controls driving of the detection unit, the readout operation, and the like. The converted digital image data is stored in the storage unit 110 shown in FIG. 1.

The driving control unit 102 is configured to switch between a plurality of control modes. That is, the driving control unit 102 is configured to perform control by switching among imaging preparation driving control 103 for making preparation in a radiation imaging enable state, standby driving control 104 for controlling a driving state at the time of standby, radiation image obtainment control 105 for obtaining a radiation image, and an offset image obtainment control 106 for obtaining an offset image. The driving control unit 102 obtains an offset image based on the set collection time by executing the offset image obtainment control 106.

The imaging preparation driving control 103 is control for resetting dark charges accumulated in each pixel by periodically reading out charges while applying, to the radiation detection unit 200, the same voltage as that at the time of imaging. It is unnecessary to handle, as image data, the charges read out at this time, and hold them in the storage unit 110. The radiation image obtainment control 105 is control for performing radiation irradiation during accumulation in each pixel while performing the same driving as that of the imaging preparation driving control 103. At this time, by switching ON/OFF of the switch element 208 in the radiation detection unit 200, charges are accumulated and read out. The readout charges are amplified by the amplifier 205 (amplification unit), converted into digital image data by the A/D converter 206 (conversion unit), and output from the radiation detection unit 200. The driving control unit 102 stores, in the storage unit 110, as a radiation image 111, the image data output from the radiation detection unit 200 by executing the radiation image obtainment control 105. The driving control unit 102 can capture a moving image by continuously executing the radiation image obtainment control 105. The driving control unit 102 can capture a still image by executing (discontinuously executing) the radiation image obtainment control 105 once.

Similarly to the imaging preparation driving control 103, with respect to the offset image obtainment control 106, the driving control unit 102 executes the control at a predetermined timing, thereby storing, in the storage unit 110, as an offset image 112, the image data output from the radiation detection unit 200 in the state in which no radiation irradiation is performed. The storage unit 110 can store the obtained (collected) offset image corresponding to each of the plurality of imaging modes by executing the offset image obtainment control 106.

(Outline of Offset Correction)

Figure 3:
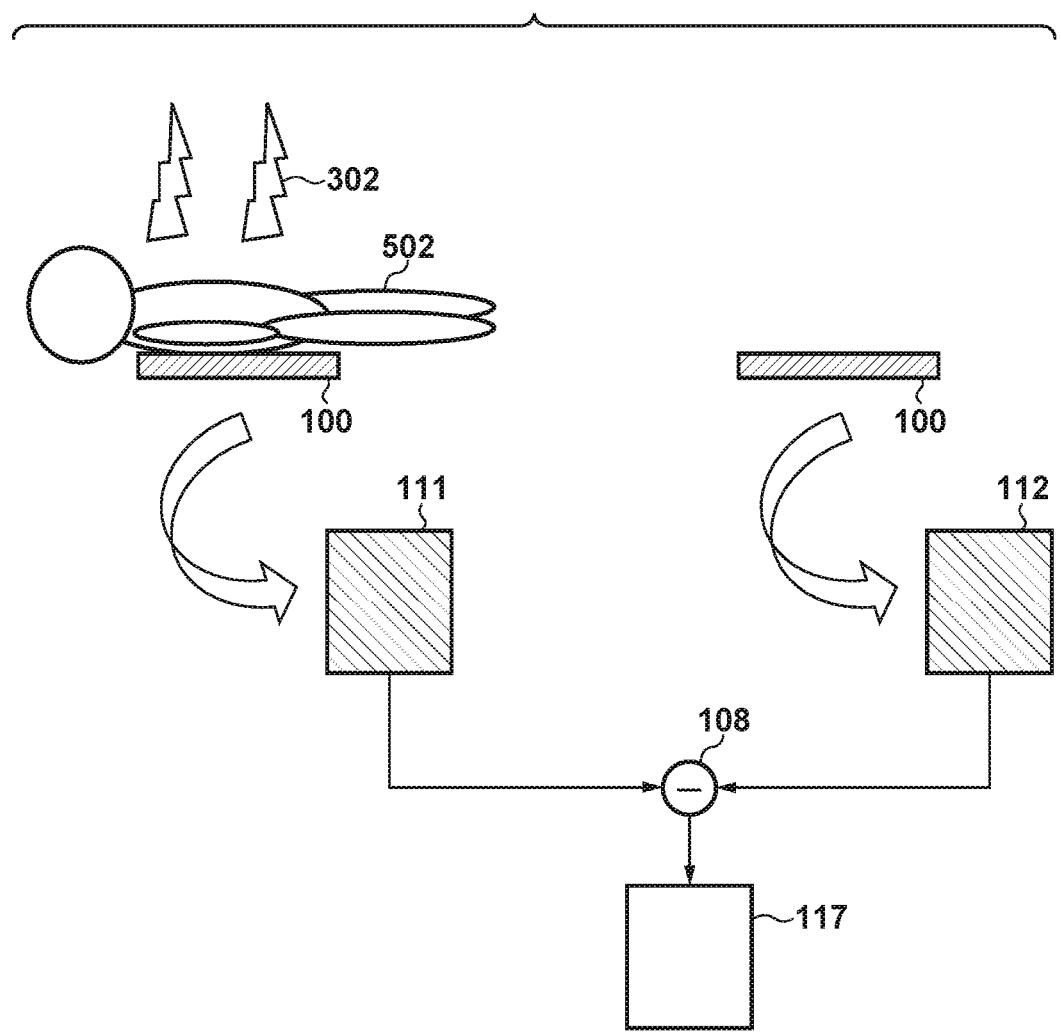
FIG. 3 is a view for schematically explaining offset correction.

FIG. 3 is a view for schematically explaining offset correction. An offset correction unit 108 of the image processing unit 107 performs offset correction of correcting an offset component of a radiation image. The driving control unit 102 stores the obtained offset image in the storage unit 110 by executing the offset image obtainment control 106. The offset correction unit 108 obtains, from the storage unit 110, the offset image corresponding to the switched imaging mode, and corrects an offset component of the radiation image. That is, when the offset correction unit 108 of the image processing unit 107 corrects the offset component (offset correction), the offset correction unit 108 obtains the radiation image 111 in each imaging mode and the offset image 112 from the storage unit 110, and performs offset correction by obtaining the difference between the images.

The offset correction unit 108 obtains a corrected image 117 based on the difference between the radiation image 111 obtained from the radiation detection unit 200 at the time of imaging and the offset image 112 obtained in advance at the time of non-imaging (when no radiation irradiation is performed), and executes offset correction processing. After that, the offset correction unit 108 transfers the corrected image 117 to the control apparatus 400 via the communication control unit 113.

Note that the offset correction processing has been explained. As a functional component of the image processing unit 107, for example, a processing unit capable of executing correction processing such as defective pixel correction or gain correction of correcting the gain variation of the amplifier in the radiation detection unit may be included.

The correction processing is not limited to execution by the radiation imaging apparatus 100. For example, the obtained radiation image 111 and offset image 112 may be transferred to the control apparatus 400 without performing correction in the radiation imaging apparatus 100, and undergo correction processing in the control apparatus 400. Furthermore, as for an offset image used for offset correction processing, for example, an image obtained by performing noise component reduction processing by averaging or the like using a plurality of obtained offset images may be used as an offset image.

The control unit 101 of the radiation imaging apparatus 100 includes the use state monitoring unit 114 that monitors the use state of the radiation imaging system (radiation imaging apparatus). As the use state of the radiation imaging system, for example, use states shown in FIG. 4 exist. FIG. 4 is a table exemplifying the use state of the radiation imaging apparatus. The use state monitoring unit 114 determines the use state of the radiation imaging system (radiation imaging apparatus) from information indicating the communication state between the radiation imaging apparatus 100 and the control apparatus 400 or the state of the radiation imaging apparatus. The use state monitoring unit 114 determines the use state of the radiation imaging apparatus based on the information indicating the state of the radiation imaging apparatus, and the offset image collection control unit 109 (collection control unit) sets, based on the determination result of the use state monitoring unit 114, a collection time for an imaging mode of a preset collection ordinal number or an imaging mode designated based on an input from the operation UI 407 (operation unit).

In accordance with the use state determined by the use state monitoring unit 114, the driving control method of the radiation detection unit 200 at the time of non-imaging and an offset image update method are switched. In this embodiment, an offset image obtainment/update method based on switching of the imaging mode will be described.

The operation procedure of the radiation imaging apparatus 100 at the time of imaging will be described below with reference to FIG. 4. A description will be provided by mainly focusing on offset image collection as the operation of the radiation imaging apparatus 100.

(Non-Use State)

The use state monitoring unit 114 determines the use state of the radiation imaging system. For example, if only the radiation imaging apparatus 100 is active and the control apparatus 400 is in a power-off state, the use state monitoring unit 114 determines a system non-use state (use state A). In this case, the use state monitoring unit 114 sets system state information in the offset image collection control unit 109 and the driving control unit 102 not to update an offset image. Use state A assumes, for example, a state in which the power of the control apparatus 400 is OFF since the control apparatus 400 is not in use while keeping the power of the radiation imaging apparatus 100 ON to maintain warmth during a non-use period such as the night. In the system non-use state (use state A), no offset image is collected (OFF).

(Temporary Use Stop State)

If, for example, both the radiation imaging apparatus 100 and the control apparatus 400 are active but an operator currently operates none of them (for example, a state corresponding to a standby time during examination, a state in which the operator is away temporarily, or the like), the use state monitoring unit 114 determines a temporary use stop state (use state B) as the use state of the radiation imaging system. In this case, the use state monitoring unit 114 sets, as the temporary use stop state of the system, system state information in the offset image collection control unit 109 and the driving control unit 102 so as to regularly update the offset image. The internal clock 115 (timer unit) obtains time information for regularly updating the offset image. In use state B, at an offset image update timing that regularly comes, the driving control unit 102 releases the standby driving control 104 to start the imaging preparation driving control 103. As described above, since the charges in the sensor array 204 are not stable immediately after switching from the standby driving control 104 to the imaging preparation driving control 103, the offset image obtainment control 106 is performed after standing by for a predetermined time to obtain and update an offset image. In the temporary use stop state (use state B), an offset image is collected in an automatic collection mode (offset image automatic collection state). After completion of update of the offset image by executing the offset image obtainment control 106, the driving control unit 102 returns to the standby driving control 104 again. In use state B, if the offset image update timing is not reached, the driving control unit 102 executes the standby driving control 104.

In use state B, the standby driving control 104 regularly updates the offset image while suppressing degradation in characteristics of the TFTs, thereby shortening the standby time at the time of resuming the use. Furthermore, in use state B, automatic collection of regularly collecting an offset image is executed. However, for example, an operation of manually starting offset image collection by externally issuing an instruction from the operation UI 407 via the control apparatus 400 is not accepted.

(In-Use State)

For example, during examination or examination preparation, the use state monitoring unit 114 determines the in-use state (use state C) as the use state of the radiation imaging system. In this case, the use state monitoring unit 114 sets system state information in the offset image collection control unit 109 and the driving control unit 102 so as to regularly update the offset image, and the driving control unit 102 executes the imaging preparation driving control 103 of the radiation detection unit 200.

In use state C, at the offset image update timing that regularly comes, the driving control unit 102 executes the offset image obtainment control 106 to obtain and update an offset image. In the in-use state (use state C), an offset image is collected in the automatic collection mode (offset image automatic collection state). If the offset image update time is not reached, the driving control unit 102 continues the imaging preparation driving control 103.

In use state D, the system state is the same as that in use state C. However, in this state, for example, an operation of manually starting offset image collection by externally issuing an instruction from the operation UI 407 via the control apparatus 400 is performed. In the in-use state (use state D), an offset image is collected in a manual collection mode (offset image manual collection state). Use state C or D assumes that examination or examination preparation is in progress, it is required to immediately move to imaging or to obtain stable image quality that is hardly influenced by a temperature variation in imaging. Therefore, it is possible to suppress the influence of a temperature variation on the image quality by regularly updating the offset image while maintaining the state in which it is possible to move to imaging any time by the imaging preparation driving control 103.

Note that in this embodiment, the use state of the system is defined by four use states A to D, as shown in FIG. 4. However, the use state is not limited to them. For example, some of the use states may not exist or another new use state may be defined.

(Example of Switching of Imaging Mode)

A characteristic arrangement according to this embodiment will be described with reference to tables (FIGS. 5A and 5B) and flowcharts (FIGS. 6A and 6B) for explaining the offset image collection time. There is known that in the radiation imaging apparatus capable of performing imaging in the plurality of imaging modes, offset images in the imaging modes have different frame rates. There are various factors for this, such as a difference in frame rate caused by a difference in image size, and a change in temperature caused by the driving time of the apparatus. The storage unit 110 needs to hold an offset image in each imaging mode, instead of saving only an offset image in one imaging mode.

This embodiment will explain the arrangement of the radiation imaging apparatus (system) in which when switching the imaging mode, a time during which an offset image in the switched imaging mode is collected is determined based on the difference in frame rate between the imaging modes, and an offset image is collected based on the determined time. The difference in frame rate includes the absolute value of a frame rate difference between the frame rate of the imaging mode and that of the imaging mode switched from the imaging mode. The difference in frame rate includes a change rate of the frame rate between the frame rate of the imaging mode and that of the imaging mode switched from the imaging mode.

The driving control unit 102 executes the offset image obtainment control 106 based on the offset image collection time determined by the offset image collection control unit 109, and saves the obtained offset image in each imaging mode in the storage unit 110. After obtaining the radiation image 111, the offset correction unit 108 obtains the offset image 112 corresponding to the imaging mode from the storage unit 110, and performs offset correction. That is, as the offset correction processing, the offset correction unit 108 obtains the corrected image 117 (FIG. 3) based on the difference between the radiation image 111 and the offset image 112.

In the radiation imaging apparatus 100 capable of performing imaging in the plurality of imaging modes, the offset image collection method has two collection modes, that is, the automatic collection mode in which the offset image is automatically collected and the manual collection mode in which the offset image is collected by, for example, a user operation via the operation UI 407 of the control apparatus 400, as described above. FIGS. 5A and 5B are tables each for explaining the offset image collection time according to the first embodiment. FIGS. 5A and 5B each exemplify switching of the imaging mode in the automatic collection mode. In each of the tables of FIGS. 5A and 5B, each imaging mode number to be collected in the automatic collection mode and a frame rate, frame rate difference, and offset image collection time corresponding to the imaging mode are set in accordance with an automatic collection ordinal number.

In the automatic collection modes shown in each of FIGS. 5A and 5B, the collection ordinal numbers are predetermined. However, the offset image collection ordinal numbers in the automatic collection mode are not limited to them. For example, the collection ordinal numbers may be changed in accordance with the imaging conditions and the like. In this embodiment, collection is performed in the imaging mode order from a higher frame rate to a lower frame rate.

The unit of the frame rate is FPS (Frame Per Second), and indicates the number of output images per second. In the imaging mode with a higher frame rate, an image output speed is higher, and the number of images outputtable per second is larger. In the imaging mode with a lower frame rate, the image output speed is lower and the number of images outputtable per second is smaller. For example, when changing between the modes having a large difference in frame rate or changing from the imaging mode with a lower frame rate to the imaging mode with a higher frame rate, an offset variation or an artifact in the image after mode switching may become large. To reduce the influence of the variation, for example, when obtaining an image by switching the imaging mode, it is possible to collect images in order from a higher frame rate to a lower frame rate.

Referring to FIG. 5A, when the imaging mode of the radiation imaging apparatus transits from imaging mode 1 to imaging mode 3 (collection ordinal number 1→2), the frame rate difference between the imaging modes is 0. When the imaging mode transits from imaging mode 3 to imaging mode 0 (collection ordinal number 2→3), the frame rate difference between the imaging modes is 15. When switching the imaging mode, the offset image collection control unit 109 determines, based on the difference in frame rate between the imaging modes, a time during which an offset image is collected in the switched imaging mode. That is, the offset image collection control unit 109 internally holds a threshold α, and sets the offset image collection time based on the comparison result between the frame rate difference and the threshold α. The threshold α is set for the frame rate difference (to be referred to as FPS_dif hereinafter) between the switched imaging modes. The offset image collection control unit 109 sets the offset image collection time after mode switching depending on whether the frame rate difference (FPS_dif) is equal to or larger than the threshold α. FIG. 5A shows an example in which the collection time is set to 5 sec if the frame rate difference (FPS_dif) is equal to or larger than the threshold α, and to 0.5 sec if the frame rate difference is smaller than the threshold. The number of seconds of the collection time is not limited to them. FIG. 5A exemplifies the frame rate difference as the difference in frame rate between the imaging modes. This embodiment, however, is not limited to this. For example, as shown in FIG. 5B, the change rate of the frame rate or the like may be used.

Figure 6A:
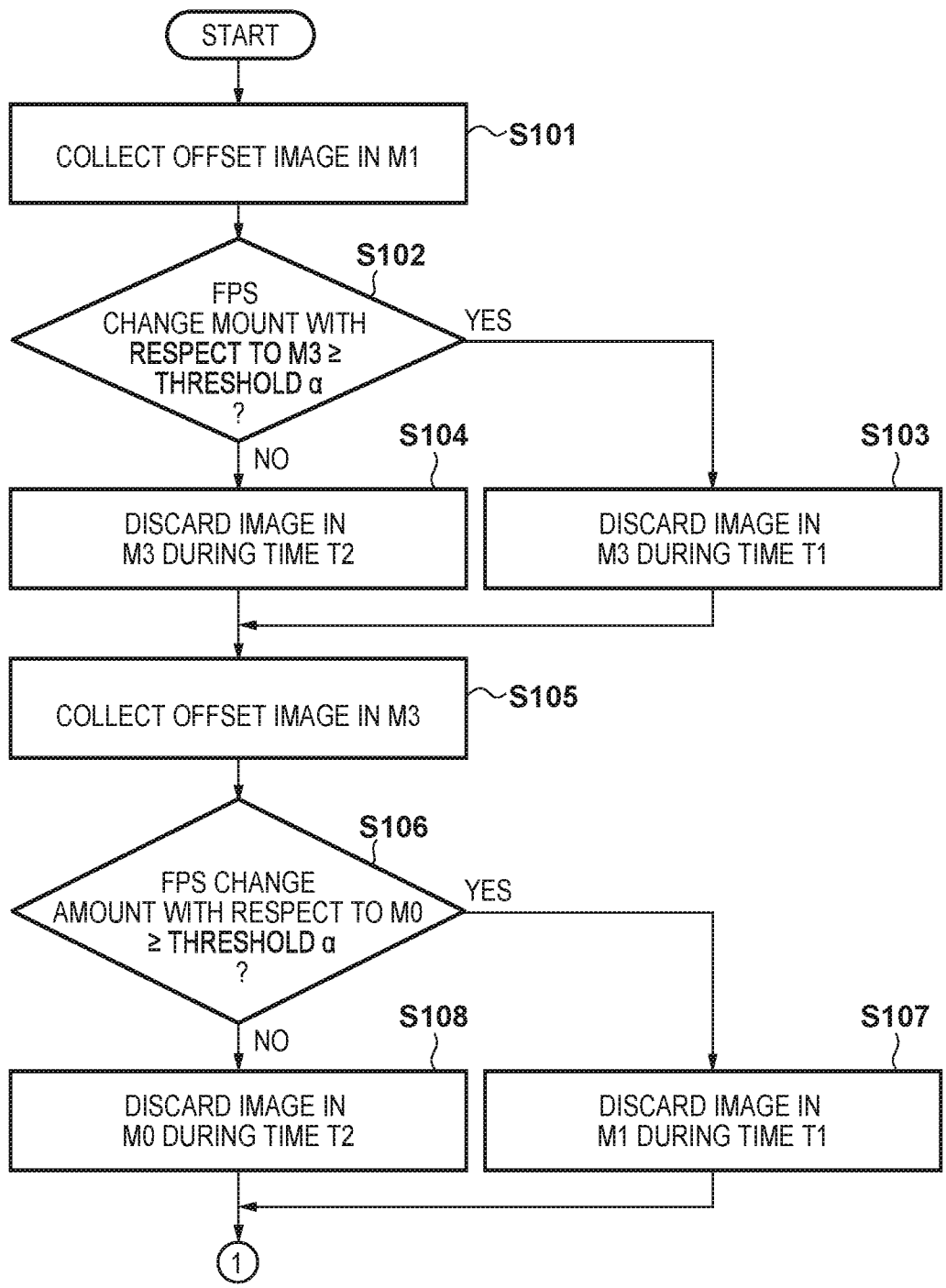
FIGS. 6A and 6B are flowcharts for explaining the processing of the radiation imaging system according to the first embodiment.
Figure 6B:
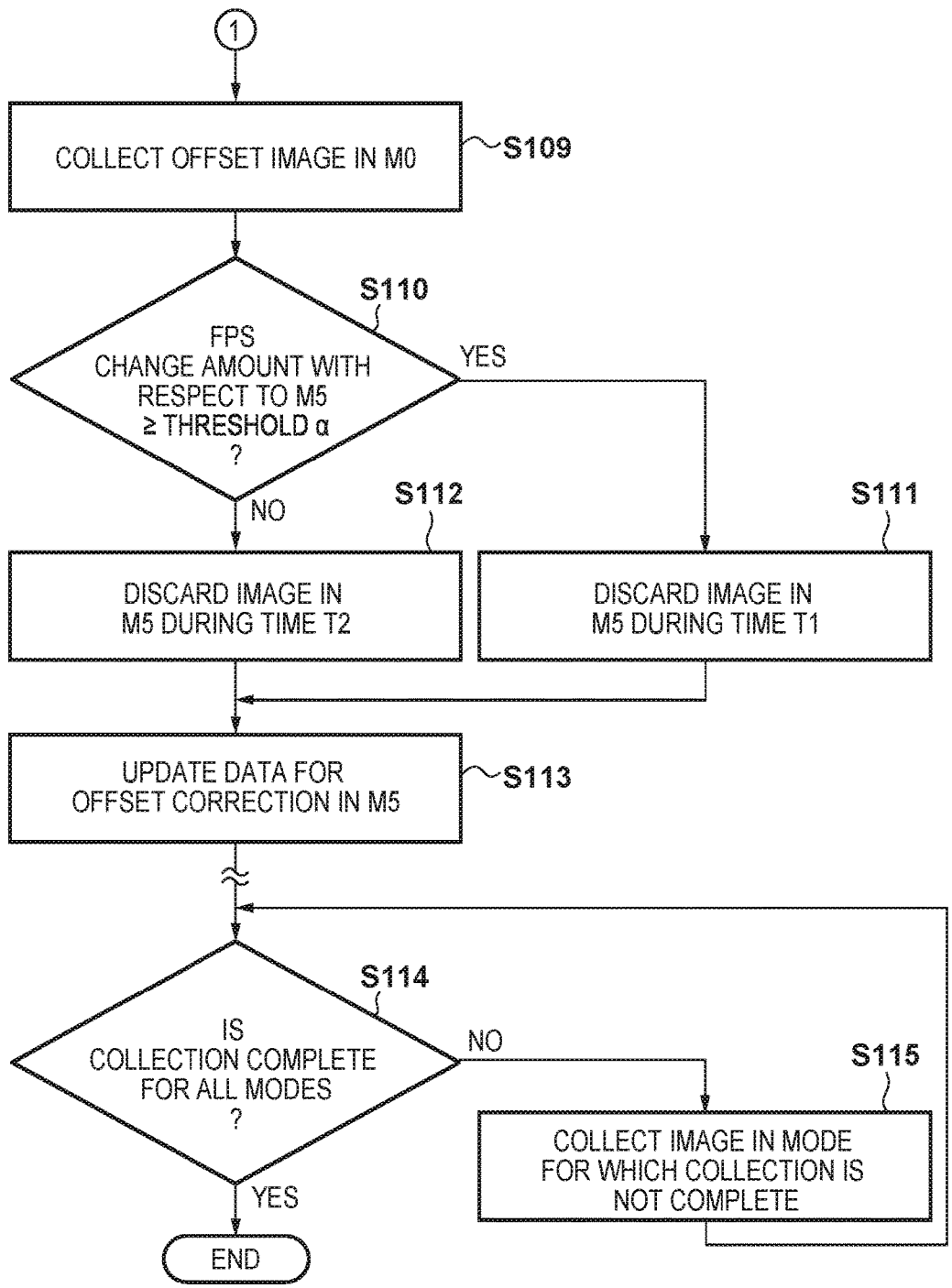

FIGS. 6A and 6B are flowcharts for explaining offset image collection processing in the radiation imaging system according to this embodiment. Referring to FIGS. 6A and 6B, Mi indicates an imaging mode i. For example, M1 indicates imaging mode 1 and M3 indicate imaging mode 3. If the offset image collection mode is the automatic collection mode, offset images are collected in accordance with the collection ordinal numbers shown in FIG. 5A. In this processing, the offset image collection control unit 109 (collection control unit) sets the offset image collection time based on the comparison result between the difference in frame rate and the threshold in a combination of the set imaging mode and the imaging mode switched from the set imaging mode. The offset image collection control unit 109 (collection control unit) sets a predetermined first time as the collection time if the difference in frame rate is equal to or larger than the threshold, and sets a predetermined second time shorter than the predetermined first time if the difference in frame rate is smaller than the threshold.

Detailed processing contents will be described below. First, in imaging mode 1 of collection ordinal number 1, the driving control unit 102 collects an offset image by executing the offset image obtainment control 106 (step S101). The process advances to imaging mode 3 of collection ordinal number 2, and the offset image collection control unit 109 compares, with the threshold α, the frame rate difference (FPS_dif) between currently driven imaging mode 1 and imaging mode 3 in which collection is performed next (step S102).

If the frame rate difference is equal to or larger than the threshold α (YES in step S102), the mode transits to imaging mode 3, and then the driving control unit 102 discards an image collected by executing the offset image obtainment control 106 without saving it in the storage unit 110 before the predetermined first time (time T1) elapses while performing a normal offset image collection operation by executing the offset image obtainment control 106 (step S103). The discarded image is not used as an offset image. After the collection time (time T1) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 3 (step S105). The collected and saved image is used as an offset image.

On the other hand, if it is determined in step S102 that the frame rate difference (FPS_dif) is smaller than the threshold α (NO in step S102), the process advances to step S104. After transiting to imaging mode 3, the driving control unit 102 discards an image collected by executing the offset image obtainment control 106 without saving it in the storage unit 110 before the predetermined second time (time T2) elapses while performing a normal collection operation (step S104). The discarded image is not used as an offset image. After the collection time (time T2) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 3 (step S105). The collected and saved image is used as an offset image.

The process advances to imaging mode 0 of collection ordinal number 3, and the offset image collection control unit 109 compares, with the threshold α, the frame rate difference (FPS_dif) between currently driven imaging mode 3 and imaging mode 0 in which collection is performed next (step S106). If the frame rate difference is equal to or larger than the threshold α (YES in step S106), the mode transits to imaging mode 0, and then the driving control unit 102 discards an image collected by executing the offset image obtainment control 106 without saving it in the storage unit 110 before the predetermined time T1 elapses while performing a normal collection operation by executing the offset image obtainment control 106 (step S107). The discarded image is not used as an offset image. After the collection time (time T1) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 0 (step S109). The collected and saved image is used as an offset image.

On the other hand, if it is determined in step S106 that the frame rate difference (FPS_dif) is smaller than the threshold α (NO in step S106), the process advances to step S108. After transiting to imaging mode 0, the driving control unit 102 discards an image collected by executing the offset image obtainment control 106 without saving it in the storage unit 110 before the time T2 elapses while performing a normal collection operation (step S108). The discarded image is not used as an offset image. After the collection time (time T2) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 0 (step S109). The collected and saved image is used as an offset image.

The process advances to imaging mode 5 of collection ordinal number 4, and the offset image collection control unit 109 compares, with the threshold α, the frame rate difference (FPS_dif) between currently driven imaging mode 0 and imaging mode 5 in which collection is performed next (step S110). If the frame rate difference is equal to or larger than the threshold α (YES in step S110), the mode transits to imaging mode 5, and then the driving control unit 102 discards an image collected by executing the offset image obtainment control 106 without saving it in the storage unit 110 before the time T1 elapses while performing a normal collection operation by executing the offset image obtainment control 106 (step S111). The discarded image is not used as an offset image. After the collection time (time T1) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 5 (step S113). The collected and saved image is used as an offset image.

On the other hand, if it is determined in step S110 that the frame rate difference (FPS_dif) is smaller than the threshold α (NO in step S110), the process advances to step S112. After transiting to imaging mode 5, the driving control unit 102 discards an image collected by executing the offset image obtainment control 106 without saving it in the storage unit 110 before the time T2 elapses while performing a normal collection operation (step S112). The discarded image is not used as an offset image. After the collection time (time T2) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 5 (step S113). The collected and saved image is used as an offset image.

The same processing is executed in accordance with the collection ordinal numbers shown in FIG. 5A. In step S114, the driving control unit 102 determines whether offset image collection is complete for all the imaging modes. If the collection is not complete (NO in step S114), the process advances to step S115. The driving control unit 102 executes the offset image obtainment control 106 to execute the offset image collection processing for the imaging mode for which collection is not complete (step S115). Then, the process returns to step S114. If the driving control unit 102 determines that the offset image collection is complete for all the imaging modes (YES in step S114), the process ends.

Note that an example in which the offset image collected by executing the offset image obtainment control 106 is not saved in the storage unit 110 has been explained as a discarding operation. The discarding operation is not limited to this. For example, after saving the image in the storage unit 110, the driving control unit 102 can control not to use the image saved in the storage unit 110 during a discarding period. Alternatively, the driving control unit 102 may control data saving so as to overwrite the offset image saved in the storage unit 110, as needed.

In addition, as the difference in frame rate between the driven imaging mode and the next imaging mode is larger, a longer time is required to remove the image influence caused by mode switching. Thus, with respect to the times T1 and T2, the time T1 needs to be longer than the time T2. As an example, as shown in FIG. 5A, as settings of the times, for example, T1=5 sec and T2=0.5 sec can be set. The threshold α can be set to, for example, 1 sec. Note that the settings of the times T1 and T2 and the threshold α are merely examples, and can be arbitrarily set.

Note that in the example of FIG. 5A, a case in which the collection time is set based on the frame rate difference as the difference (change amount) in frame rate has been explained. The difference (change amount) in frame rate is not limited to the frame rate difference. For example, the offset image collection control unit 109 can set the offset image collection time based on an item such as the change rate of the frame rate, as shown in FIG. 5B. When the imaging mode of the radiation imaging apparatus 100 transits from imaging mode 1 to imaging mode 3 (collection ordinal number 1→2), the change rate of the frame rate between the imaging modes is 0 (%). When the imaging mode transits from imaging mode 3 to imaging mode 0 (collection ordinal number 2→3), the frame rate difference between the modes is 50 (%). The offset image collection control unit 109 internally holds a threshold β of the change rate, and sets the offset image collection time based on the comparison result between the change rate of the frame rate and the threshold β. The threshold β is set for the change rate of the frame rate during switching of the imaging mode. The offset image collection control unit 109 can set the offset image collection time after mode switching depending on whether the change rate of the frame rate is equal to or larger than the threshold β.

Figure 7:
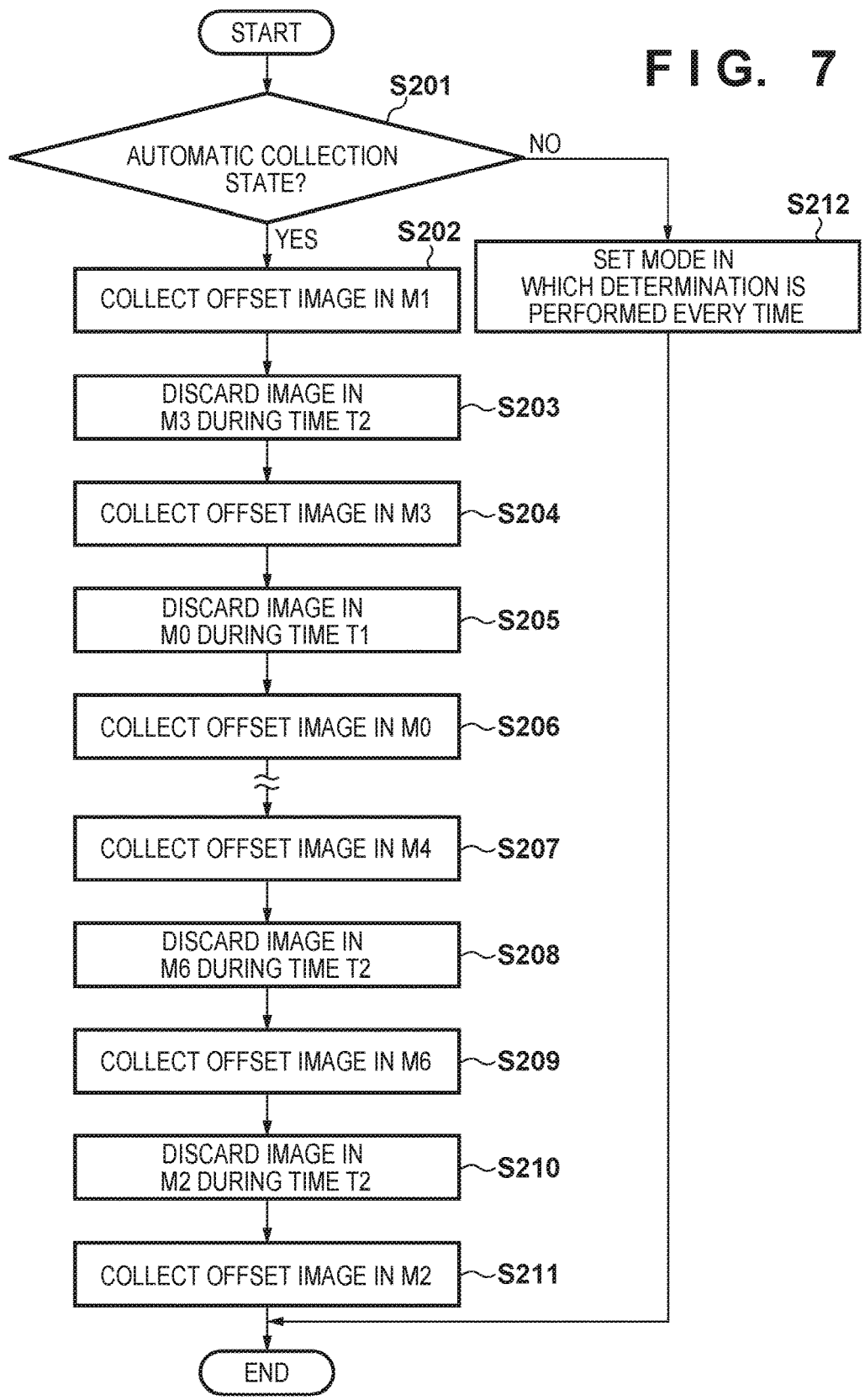
FIG. 7 is a flowchart for explaining the processing of the radiation imaging system according to the first embodiment.

FIG. 7 is a flowchart for explaining processing when an offset image is automatically collected. The use state monitoring unit 114 monitors the use state of the radiation imaging system, and determines whether the state is the automatic collection state (step S201). The automatic collection state is a state corresponding to use state B or C described with reference to FIG. 4. If the state is not the automatic collection state (NO in step S201), for example, if the state corresponds to use state A or D described with reference to FIG. 4, the process advances to step S212. In step S212, the offset image collection control unit 109 sets the mode (manual collection mode) in which offset image collection is determined every time, and ends the process.

On the other hand, if the use state monitoring unit 114 determines the automatic collection state in step S201 (YES in step S201), the process advances to step S202.

If the offset image collection mode is the automatic collection mode, for example, offset images are collected in accordance with the collection ordinal numbers shown in FIG. 5A. If the collection ordinal numbers in automatic collection are preset ordinal numbers (fixed ordinal numbers), offset image collection in each imaging mode and setting of a discarding time during mode transition are done by processes in steps S202 to S211, as will be described below.

In the flowcharts of FIGS. 6A and 6B, the discarding time during mode transition is set based on the comparison result between the threshold α and the frame rate difference as the difference in frame rate. However, referring to FIG. 7, since the collection ordinal numbers in automatic collection are preset ordinal numbers (fixed ordinal numbers), a preset time can be used as the discarding time during mode transition. Therefore, in the flowchart of FIG. 7, offset images in the imaging modes after transition can be collected in accordance with the preset ordinal numbers (fixed ordinal numbers) without performing the comparison processes in steps S102, S106, and S110 of FIGS. 6A and 6B. In the processing of the flowchart of FIG. 7, the offset image collection control unit 109 (collection control unit) sets an offset image collection time based on the difference in frame rate in a combination of the set imaging mode and the imaging mode switched from the set imaging mode. The combination of the imaging modes is, for example, a combination of imaging modes 1 and 3 in steps S202 and S203, and the collection time (time T2) is set based on the difference in frame rate. Contents of the processing steps will be described in detail below. In imaging mode 1 of collection ordinal number 1, the driving control unit 102 collects an offset image by executing the offset image obtainment control 106 (step S202).

The process advances to imaging mode 3 of collection ordinal number 2, and the offset image collection control unit 109 sets an offset image collection time to T2 in imaging mode transition between currently driven imaging mode 1 and imaging mode 3 in which collection is performed next. After transiting to imaging mode 3, the driving control unit 102 discards an image collected by executing the offset image obtainment control 106 without saving it in the storage unit 110 before the time T2 elapses while performing a normal collection operation (step S203). The discarded image is not used as an offset image. After the collection time (time T2) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 3 (step S204). The collected and saved image is used as an offset image.

The process advances to imaging mode 0 of collection ordinal number 3, and the offset image collection control unit 109 sets an offset image collection time to T1 in imaging mode transition between currently driven imaging mode 3 and imaging mode 0 in which collection is performed next. After transiting to imaging mode 0, and then the driving control unit 102 discards an image collected by executing the offset image obtainment control 106 without saving it in the storage unit 110 before the time T1 elapses while performing a normal collection operation (step S205). The discarded image is not used as an offset image. After the collection time (time T1) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 0 (step S206). The collected and saved image is used as an offset image.

The same processing is executed in accordance with the collection ordinal numbers shown in FIG. 5A. In step S207, an offset image in imaging mode 4 is collected by executing the offset image obtainment control 106 by the driving control unit 102, and the collected offset image is saved in the storage unit 110 (step S207). The process advances to imaging mode 6 of collection ordinal number 6, and the offset image collection control unit 109 sets an offset image collection time to T2 in imaging mode transition between currently driven imaging mode 4 and imaging mode 6 in which collection is performed next. After transiting to imaging mode 6, the driving control unit 102 discards an image collected by executing the offset image obtainment control 106 without saving it in the storage unit 110 before the time T2 elapses while performing a normal collection operation (step S208). The discarded image is not used as an offset image. After the collection time (time T2) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 6 (step S209). The collected and saved image is used as an offset image.

The process advances to imaging mode 2 of collection ordinal number 7, and the offset image collection control unit 109 sets an offset image collection time to T2 in imaging mode transition between currently driven imaging mode 6 and imaging mode 2 in which collection is performed next. After transiting to imaging mode 2, and then the driving control unit 102 discards an image collected by executing the offset image obtainment control 106 without saving it in the storage unit 110 before the time T2 elapses while performing a normal collection operation (step S210). The discarded image is not used as an offset image. After the collection time (time T2) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 2 (step S211). The collected and saved image is used as an offset image. The above processing collects the offset images in the respective imaging modes by automatic collection (fixed ordinal numbers), and saved in the storage unit 110. Then, the process ends.

FIGS. 8A and 8B are timing charts each for explaining the offset image collection time. Each of pulse waveforms shown in FIG. 8A or 8B indicates an image readout driving signal controlled by the driving control unit 102. The radiation detection unit 200 outputs an image based on charges accumulated in a state in which no radiation irradiation is performed, and the driving control unit 102 executes the offset image obtainment control 106 to obtain, as an offset image, an image output from the radiation detection unit 200 after the collection time (T1 or T2) elapses since the start of driving of the radiation detection unit 200 in the switched imaging mode. In execution of the offset image obtainment control 106, the driving control unit 102 does not obtain, as an offset image, an image output from the radiation detection unit 200 before the collection time (T1 or T2) elapses.

FIG. 8A shows a case in which the difference in frame rate (for example, the frame rate difference, the change rate of the frame rate, or the like) between the currently driven imaging mode (currently driven mode) and the offset image collection mode is equal to or larger than the threshold α (the offset image collection time T1 is set). In this case, an image is discarded not to be used as an offset image during a period from when the mode is switched to the imaging mode in which an offset image is desirably collected (after imaging mode transition) until the collection time (time T1) elapses. An image collected after the time T1 elapses is collected as an offset image, and saved in the storage unit 110 as a new offset image.

FIG. 8B shows a case in which the difference in frame rate (for example, the frame rate difference, the change rate of the frame rate, or the like) between the currently driven imaging mode (currently driven mode) and the offset image collection mode is smaller than the threshold α (the offset image collection time T2 is set). In this case, an image is discarded not to be used as an offset image during a period from when the mode is switched to the imaging mode in which an offset image is desirably collected (after imaging mode transition) until the collection time (time T2) elapses. An image collected after the time T2 elapses is collected as an offset image, and saved in the storage unit 110 as a new offset image.

As the difference in frame rate between the currently driven imaging mode and the next imaging mode is larger, a longer time is required to remove the image influence caused by mode switching. However, if the difference in frame rate is smaller, the time required to remove the image influence caused by mode switching can be set shorter. With respect to the times T1 and T2, during the time T2, it is possible to collect an offset image to be used for offset correction within a shorter time, as compared with the time T1. That is, it is possible to obtain an offset image for offset correction by reducing the influence of an artifact caused by switching of the imaging mode. It is possible to obtain, within a shorter time in accordance with the difference in frame rate, an offset image to be used for offset correction. Thus, even if an imaging schedule is full, an offset image for offset correction can be obtained and updated during a non-imaging period.

(Second Embodiment)

The first embodiment has explained the processing of automatically collecting an offset image at a predetermined timing. This embodiment will describe processing of starting offset image collection at an arbitrary timing. For example, when the user operates offset image obtainment control 106 by a radiation imaging application using an operation UI 407, offset image collection processing can start.

In an imaging site, it may be desired to collect an offset image immediately before radiation image capturing, instead of offset correction using a regularly, automatically collected offset image. Imaging is preferentially performed during an imaging operation. Therefore, even if an offset image is being automatically collected, if an imaging request is input, the automatic collection of the offset image is stopped to shift to imaging, and it may become impossible to collect the offset image. Thus, if an imaging schedule is full, a situation in which no collection time can be ensured and offset correction needs to be performed using an old offset image may occur. Since an offset image tends to include a change with time, even if offset correction is executed using an offset image having a different characteristic, it may be impossible to completely correct the influence of a change with time.

When an operator (user) selects, via the operation UI 407, an imaging mode in which an offset image is desirably collected, and gives an instruction to start offset image collection, a driving control unit 102 of a control unit 101 collects an offset image by executing the offset image obtainment control 106. Similarly to the first embodiment, by comparing, with a corresponding threshold, a frame rate difference (FPS_dif) between the currently driven imaging mode and the imaging mode in which an offset image is desirably collected or the change rate of the frame rate as a difference in frame rate, an offset image collection control unit 109 can set an offset image collection time in accordance with a comparison result.

FIGS. 9A and 9B are tables each for explaining an offset image collection time in a manual mode according to the second embodiment. Similarly to FIG. 5A, FIG. 9A shows an example in which an offset image collection time is set based on the frame rate difference (absolute value) as the difference in frame rate. Similarly to FIG. 5B, FIG. 9B shows an example in which an offset image collection time is set based on the change rate of the frame rate as the difference in frame rate. Similarly to FIGS. 5A and 5B, in each of FIGS. 9A and 9B, an imaging mode change (collection ordinal number) and a frame rate change (fps), a frame rate difference (FPS_dif) or a change rate (%) of the frame rate, and a collection time (sec) corresponding to the imaging mode change are exemplarily set.

Figure 10:
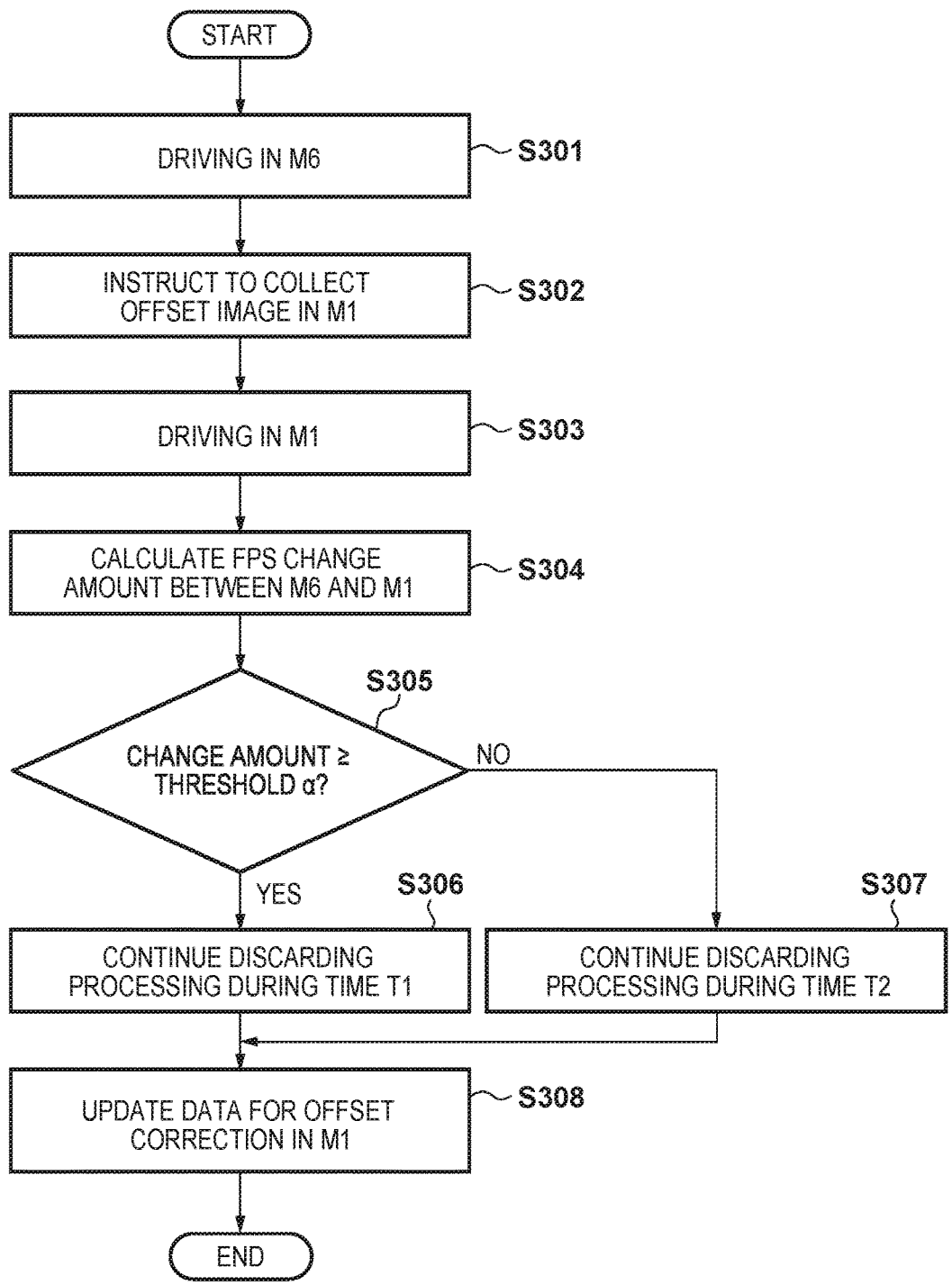
FIG. 10 is a flowchart for explaining the processing of a radiation imaging system according to the second embodiment.

FIG. 10 is a flowchart for explaining the processing of a radiation imaging system according to the second embodiment. For example, the currently driven mode is imaging mode 6 (step S301), and then collection of an offset image in imaging mode 1 is instructed via the operation UI 407 (step S302). A radiation imaging apparatus 100 performs an imaging mode switching operation, and imaging mode 6 as the currently driven mode is switched to imaging mode 1 (step S303).

The offset image collection control unit 109 calculates the difference in frame rate (for example, the frame rate difference, the change rate of the frame rate, or the like) between imaging modes 6 and 1 (step S304). The offset image obtainment control 106 compares the difference in frame rate calculated in step S304 with the threshold (step S305).

If the difference in frame rate is equal to or larger than the threshold (YES in step S305), the driving control unit 102 discards an image collected by executing the offset image obtainment control 106 without saving it in a storage unit 110 before a time T1 elapses while performing a normal collection operation by executing the offset image obtainment control 106 (step S306). The discarding processing is continued until the time T1 elapses. The discarded image is not used as an offset image. After the collection time (time T1) elapses since the start of driving of a radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 1 (step S308). The collected and saved image is used as an offset image.

On the other hand, it is determined in step S305 that the difference in frame rate is smaller than the threshold (NO in step S305), the process advances to step S307. The driving control unit 102 discards an image collected by executing the offset image obtainment control 106 without saving it in the storage unit 110 before a time T2 elapses while performing a normal collection operation (step S307). The discarded image is not used as an offset image. After the collection time (time T2) elapses since the start of driving of the radiation detection unit 200 in the switched imaging mode, the driving control unit 102 obtains an offset image by executing the offset image obtainment control 106. The image collected by executing the offset image obtainment control 106 by the driving control unit 102 is saved in the storage unit 110 as an offset image in imaging mode 1 (step S308). The collected and saved image is used as an offset image. When the offset image collected in step S308 is saved in the storage unit 110, an offset image for offset correction in imaging mode 1 is updated. Then, the processing of obtaining and updating an offset image for offset correction in switching from imaging mode 6 to imaging mode 1 ends.

As the difference in frame rate (for example, the frame rate difference, the change rate of the frame rate, or the like) between the currently driven imaging mode and the changed imaging mode is larger, a longer time is required to remove (reduce) the influence of switching of the imaging mode. Thus, with respect to the offset image collection time (discarding time) T1 in step S306 and the offset image collection time (discarding time) T2 in step S307, the time T1 needs to be longer than the time T2. According to this embodiment, even if offset image collection is executed at an arbitrary timing, it is possible to obtain an offset image for offset correction by reducing the influence of an artifact caused by switching of the imaging mode based on the difference in frame rate between the currently driven imaging mode and the switched imaging mode, and update it.

(Third Embodiment)

The third embodiment will describe an arrangement in which an offset image collection time is changed in accordance with the difference in frame rate between a currently operating imaging mode and an imaging mode in which an offset image is collected next. In this embodiment, an offset image collection control unit 109 (collection control unit) sets a collection time changed in accordance with the difference in frame rate in a combination of the set imaging mode and the imaging mode switched from the set imaging mode.

FIG. 11 is a table for explaining an offset image collection time according to the third embodiment. FIG. 11 shows, with respect to a frame rate difference as an example of the difference in frame rate, the relationship among a frame rate change between the currently operating imaging mode and the imaging mode in which an offset image is collected next, the frame rate difference (absolute value), and the offset image collection time.

In the example shown in FIG. 11, when the currently operating imaging mode of the radiation imaging apparatus transits from an imaging mode with a frame rate of 30 FPS to an imaging mode with a frame rate of 15 FPS, the frame rate difference between the imaging modes is 15. When the imaging mode transits from an imaging mode with a frame rate of 30 FPS to an imaging mode with a frame rate of 7.5 FPS, the frame rate difference between the imaging modes is 22.5.

Referring to FIG. 11, the offset image collection time (T) can be calculated by an expression (c*(difference in frame rate between imaging modes): * represents integration). Before the collection time (T) elapses since the start of driving of a radiation detection unit 200 in the switched imaging mode, an offset image is discarded without being saved in a storage unit 110. After the collection time (T) elapses, a driving control unit 102 obtains an offset image by executing offset image obtainment control 106. The offset image collected by executing the offset image obtainment control 106 by the driving control unit 102 is saved in the storage unit 110.

The difference in frame rate between the imaging modes is, for example, the frame rate difference (FPS_dif) in the example of FIG. 11. The difference in frame rate is not limited to this, and may be the change rate of the frame rate or the like. The predetermined value c is an arbitrarily settable value, and a value obtained by multiplying the difference in frame rate by the predetermined value c is set as a collection time. In accordance with the expression (c*FPS_dif), the offset image collection control unit 109 sets a longer image collection time as the frame rate difference is larger, and sets a shorter image collection time as the frame rate difference is smaller. The offset image collection control unit 109 sets the collection time (T) based on the difference in frame rate (for example, the frame rate difference, the change rate of the frame rate, or the like) between the imaging modes.

With reference to FIG. 11, a case in which there is one predetermined value c has been exemplified. However, for example, it is possible to change the predetermined value (ci) and apply it to the expression in accordance with the difference in frame rate. When executing automatic collection of an offset image by an internal arithmetic processing unit or manual collection of an offset image is manually instructed via an operation input of an operation UI 407 (operation unit), the offset image collection control unit 109 can execute an operation based on the expression (c*FPS_dif), and set the offset image collection time.

FIG. 12 is a flowchart for explaining the processing of a radiation imaging system according to the third embodiment. The processing shown in FIG. 12 exemplifies processing when the imaging mode transits from currently driven imaging mode 6 to imaging mode 1 in which collection is performed next.

If the currently driven imaging mode is imaging mode 6 (step S401) and, for example, collection of an offset image in imaging mode 1 is instructed via the operation UI 407 (step S402), the radiation imaging apparatus performs an imaging mode switching operation to switch to imaging mode 1 (step S403).

Next, the offset image collection control unit 109 obtains, as the difference in frame rate, the frame rate difference between the frame rate of imaging mode 6 and the frame rate of imaging mode 1 in which an offset image is collected next, and calculates the collection time (T) by multiplying the frame rate difference by the predetermined value c (step S404).

Before the collection time (T) elapses since switching of the imaging mode, the driving control unit 102 continues discarding the offset image without saving it in the storage unit 110 (step S405). After the collection time (T) elapses since the start of driving of the radiation detection unit 200 in the switched imaging mode, the driving control unit 102 obtains an offset image by executing the offset image obtainment control 106. That is, the driving control unit 102 saves, in the storage unit 110, the offset image collected by executing the offset image obtainment control 106 (step S406). When the offset image collected in step S406 is saved in the storage unit 110, the offset image for offset correction in imaging mode 1 is updated. Then, the processing of obtaining and updating an offset image for offset correction in switching from imaging mode 6 to imaging mode 1 ends.

With reference to FIG. 12, processing when offset image collection is manually instructed via the operation UI 407 has been exemplarily described. The present invention is not limited to the manual processing. When executing automatic collection of an offset image, it is possible to obtain the collection time (T) by multiplying the difference in frame rate (for example, the frame rate difference, the change rate of the frame rate, or the like) by the predetermined value c.

In this embodiment, the image collection time is calculated using the expression. The present invention, however, is not limited to this. The offset image collection control unit 109 may have a setting table in which the collection time (T) is set for each combination for mode transition, and set the image collection time based on the value in this table. That is, the offset image collection control unit 109 (collection control unit) can have a table in which the collection time is set for each combination of the set imaging mode and the imaging mode switched from the set imaging mode, and set the collection time based on the setting of the table.

According to each embodiment, it is possible to provide a radiation imaging technique capable of obtaining an offset image for offset correction by reducing the influence of an artifact caused by switching of the imaging mode. Since an offset image to be used for offset correction can be obtained within a shorter time in accordance with the difference in frame rate, even if an imaging schedule is full, it is possible to obtain and update the offset image for offset correction during a non-imaging period.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194775, filed Sep. 30, 2016, which is hereby incorporated by reference herein in its entirety.

What is claimed is:

1. A radiation imaging apparatus that is operable in a plurality of imaging modes with different frame rates, comprising:
a radiation detection unit configured to obtain, based on a set imaging mode, a radiation image based on charges accumulated by radiation irradiation;
a collection control unit configured to set, based on a difference in frame rate in a combination of the set imaging mode and a second imaging mode switched from the imaging mode, a collection time of an offset image for correcting an offset component of the radiation image; and
an image obtainment unit configured to obtain the offset image based on the collection time, wherein
the collection control unit sets the collection time of the offset image based on a comparison result between a threshold and the difference in frame rate in the combination.

2. The apparatus according to claim 1, wherein the collection control unit sets a first time as the collection time if the difference in frame rate is not smaller than the threshold, and
the collection control unit sets a second time shorter than the first time as the collection time if the difference in frame rate is smaller than the threshold.

3. The apparatus according to claim 1, wherein the collection control unit has a table in which the collection time is set for each combination, and sets the collection time based on the setting of the table.

4. The apparatus according to claim 1, wherein the image obtainment unit obtains the offset image after the collection time elapses since a start of driving of the radiation detection unit in the switched imaging mode.

5. The apparatus according to claim 1, wherein the radiation detection unit outputs an image based on charges accumulated in a state in which no radiation irradiation is performed, and
the image obtainment unit obtains as the offset image the image output from the radiation detection unit after the collection time elapses since a start of driving of the radiation detection unit in the switched imaging mode.

6. The apparatus according to claim 5, wherein the image obtainment unit does not obtain as the offset image the image output from the radiation detection unit before the collection time elapses.

7. The apparatus according to claim 1, further comprising:
a storage unit configured to store an offset image corresponding to each of the plurality of imaging modes, and
a correction unit configured to correct the offset component of the radiation image, wherein
the image obtainment unit stores the obtained offset image in the storage unit, and
the correction unit obtains the offset image corresponding to the switched imaging mode from the storage unit, and corrects the offset component of the radiation image.

8. A radiation imaging apparatus that is operable in a plurality of imaging modes with different frame rates, comprising:
   a radiation detection unit configured to obtain, based on a set imaging mode, a radiation image based on charges accumulated by radiation irradiation;
   a collection control unit configured to set, based on a difference in frame rate in a combination of the set imaging mode and a second imaging mode switched from the imaging mode, a collection time of an offset image for correcting an offset component of the radiation image; and
   an image obtainment unit configured to obtain the offset image based on the collection time, wherein
   the difference in frame rate includes an absolute value of a frame rate difference between a frame rate of the imaging mode and a frame rate of the second imaging mode switched from the imaging mode.

9. A radiation imaging apparatus that is operable in a plurality of imaging modes with different frame rates, comprising:
   a radiation detection unit configured to obtain, based on a set imaging mode, a radiation image based on charges accumulated by radiation irradiation;
   a collection control unit configured to set, based on a difference in frame rate in a combination of the set imaging mode and a second imaging mode switched from the imaging mode, a collection time of an offset image for correcting an offset component of the radiation image; and
   an image obtainment unit configured to obtain the offset image based on the collection time, wherein
   the difference in frame rate includes a change rate of the frame rate between a frame rate of the imaging mode and a frame rate of the second imaging mode switched from the imaging mode.

10. A radiation imaging apparatus that is operable in a plurality of imaging modes with different frame rates, comprising:
    a radiation detection unit configured to obtain, based on a set imaging mode, a radiation image based on charges accumulated by radiation irradiation;
    a collection control unit configured to set, based on a difference in frame rate in a combination of the set imaging mode and a second imaging mode switched from the imaging mode, a collection time of an offset image for correcting an offset component of the radiation image;
    an image obtainment unit configured to obtain the offset image based on the collection time, and
    a state monitoring unit configured to determine a use state of the radiation imaging apparatus based on information indicating a state of the radiation imaging apparatus, wherein
    based on a determination result of the state monitoring unit, the collection control unit sets the collection time for one of an imaging mode of a preset collection ordinal number and an imaging mode designated based on an input from an operation unit.

11. A radiation imaging system including a radiation imaging apparatus that is operable in a plurality of imaging modes with different frame rates, comprising:
    a radiation detection unit configured to obtain, based on a set imaging mode, a radiation image based on charges accumulated by radiation irradiation;
    a collection control unit configured to set, based on a difference in frame rate in a combination of the set imaging mode and a second imaging mode switched from the imaging mode, a collection time of an offset image for correcting an offset component of the radiation image; and
    an image obtainment unit configured to obtain the offset image based on the collection time, wherein
    the collection control unit sets the collection time of the offset image based on a comparison result between a threshold and the difference in frame rate in the combination.

12. A radiation imaging method for a radiation imaging apparatus that is operable in a plurality of imaging modes with different frame rates, comprising:
    a radiation detection unit configured to output, based on a set imaging mode, a radiation image based on charges accumulated by radiation irradiation;
    setting, based on a difference in frame rate in a combination of the set imaging mode and a second imaging mode switched from the imaging mode, a collection time of an offset image for correcting an offset component of the radiation image; and
    obtaining the offset image based on the collection time, wherein
    the collection time of the offset image is set based on a comparison result between a threshold and the difference in frame rate in the combination.

13. A computer-readable non-transitory storage medium storing a program for causing a computer to execute each step of a radiation imaging method in a radiation imaging apparatus that is operable in a plurality of imaging modes with different frame rates, and includes a radiation detection unit configured to output, based on a set imaging mode, a radiation image based on charges accumulated by radiation irradiation, the method comprising:
    setting, based on a difference in frame rate in a combination of the set imaging mode and a second imaging mode switched from the imaging mode, a collection time of an offset image for correcting an offset component of the radiation image; and
    obtaining the offset image based on the collection time, wherein
    the collection time of the offset image is set based on a comparison result between a threshold and the difference in frame rate in the combination.

* * * * *